A. B. MELHOUSE & L. P. MOGSTAD.
GRAIN AND HAY LOADER.
APPLICATION FILED SEPT. 12, 1910.

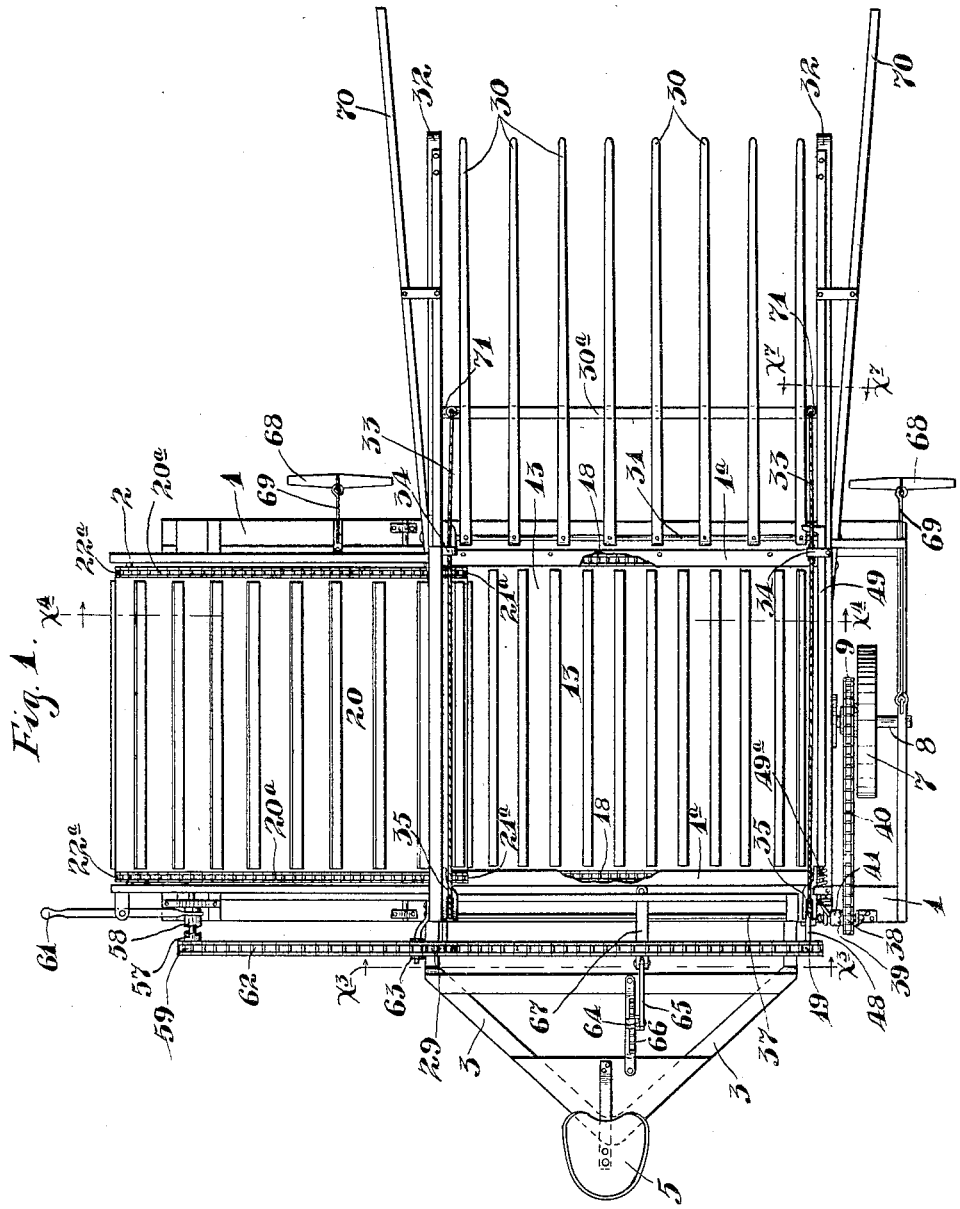

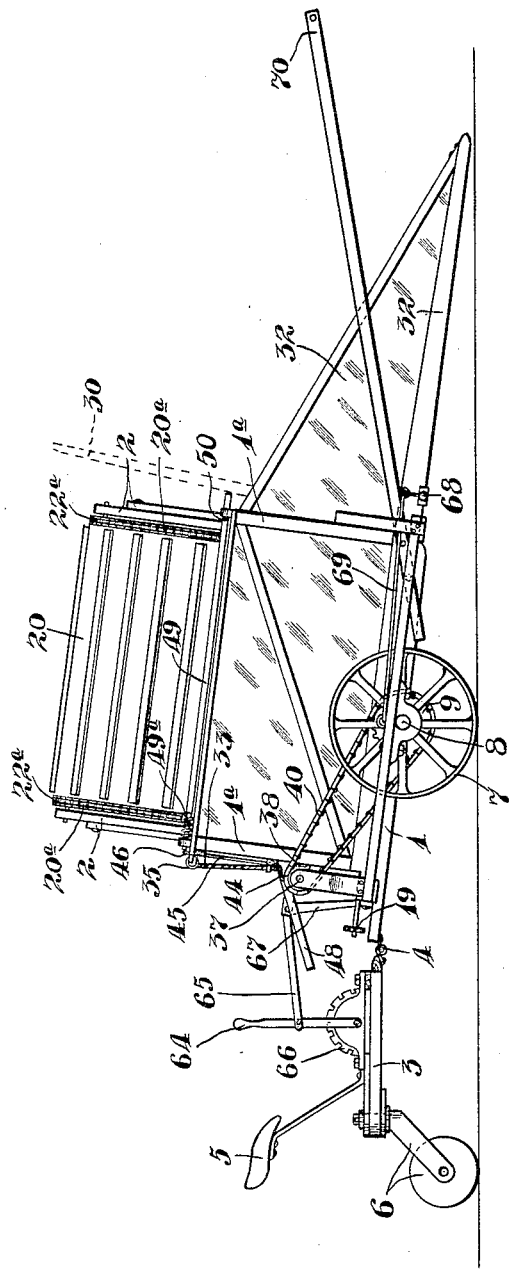

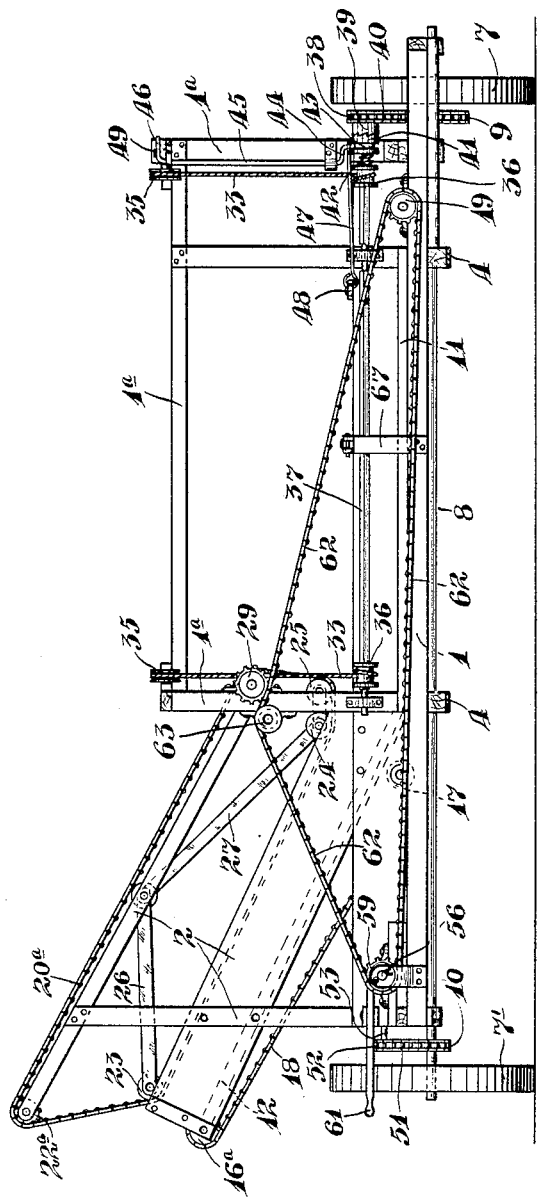

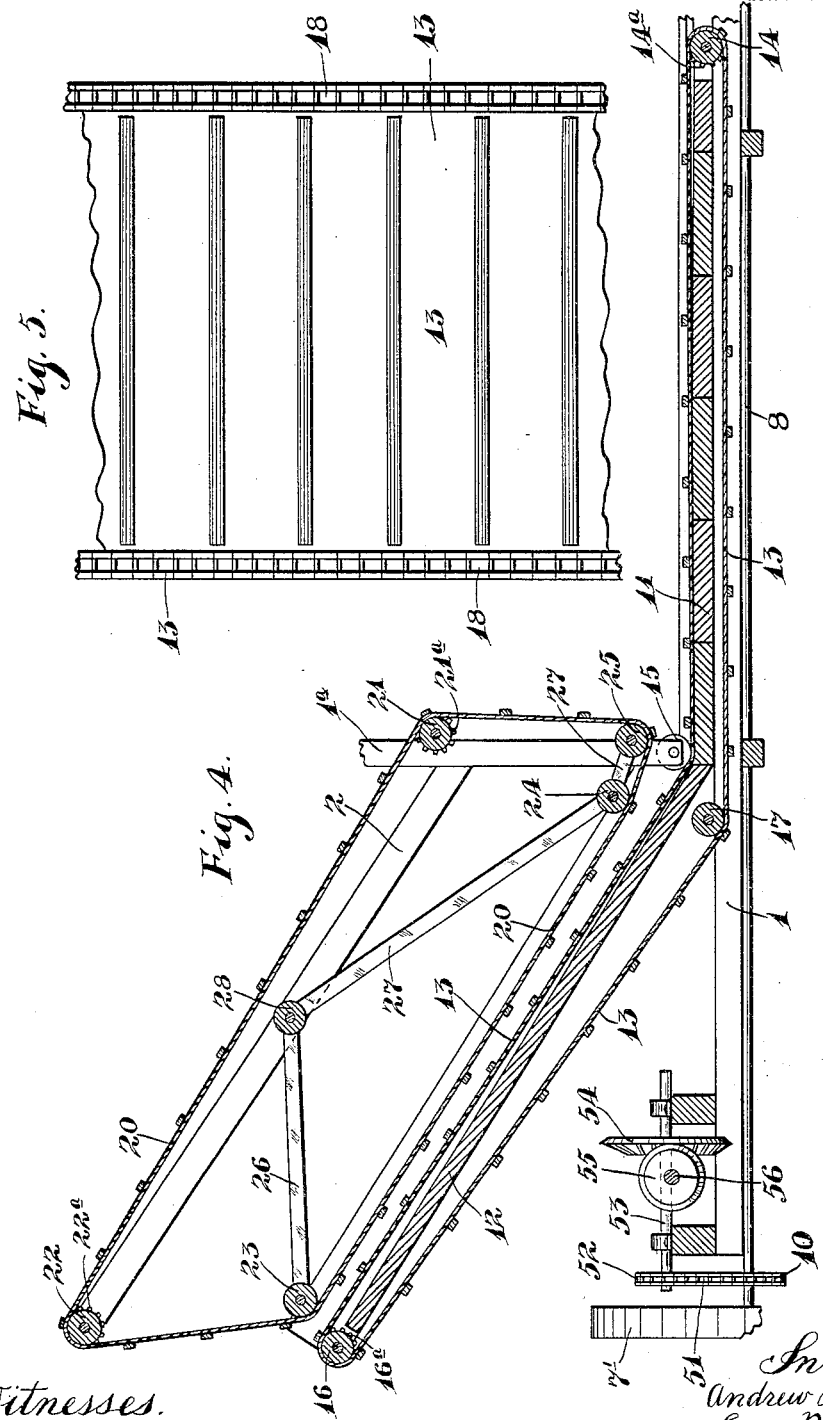

1,056,199.

Patented Mar. 18, 1913.
6 SHEETS—SHEET 5.

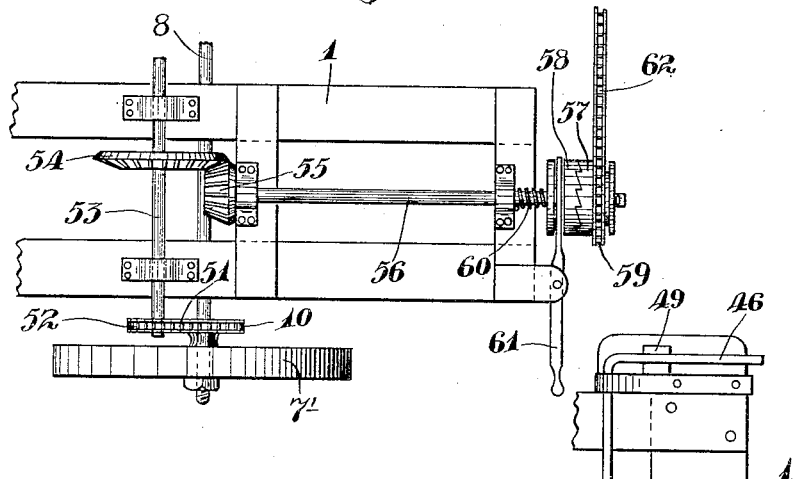
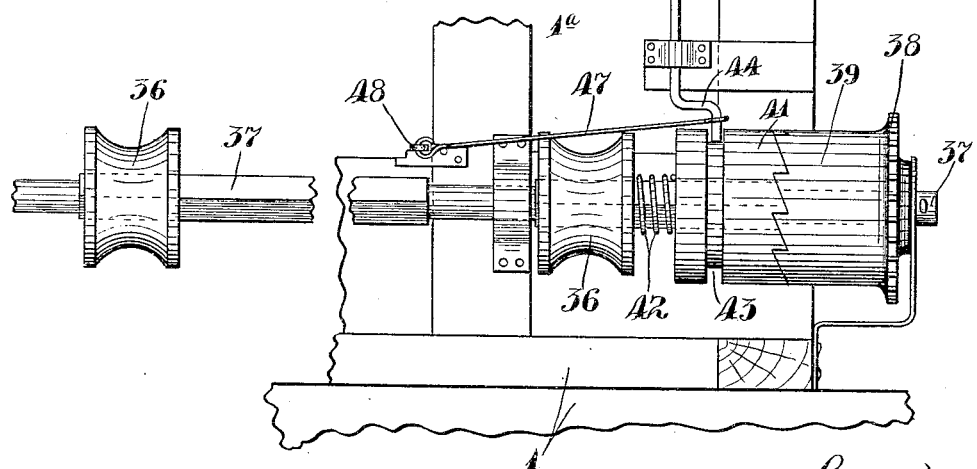

UNITED STATES PATENT OFFICE.

ANDREW B. MELHOUSE AND LARS P. MOGSTAD, OF BALFOUR, NORTH DAKOTA.

GRAIN AND HAY LOADER.

1,056,199. Specification of Letters Patent. Patented Mar. 18, 1913.

Application filed September 12, 1910. Serial No. 581,473.

*To all whom it may concern:*

Be it known that we, ANDREW B. MELHOUSE and LARS P. MOGSTAD, citizens of the United States, residing at Balfour, in the county of McHenry and State of North Dakota, have invented certain new and useful Improvements in Grain and Hay Loaders; and we do hereby declare the following to be a full, clear, and exact description of the invention, such as will enable others skilled in the art to which it appertains to make and use the same.

Our invention has for its object to provide an improved grain and hay loader adapted, under forward movement, to pick up loose hay or loose grain or bundles of grain and to deposit the same in a wagon box or on a rack driven at one side of the machine.

To the above ends, the invention consists of the novel devices and combinations of devices hereinafter described and defined in the claims.

In the accompanying drawings, which illustrate the invention, like characters indicate like parts throughout the several views.

Figure 8:
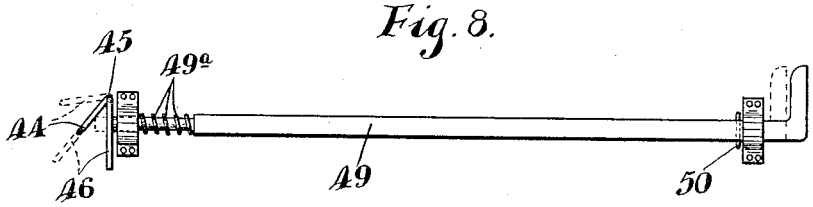
Figure 6:
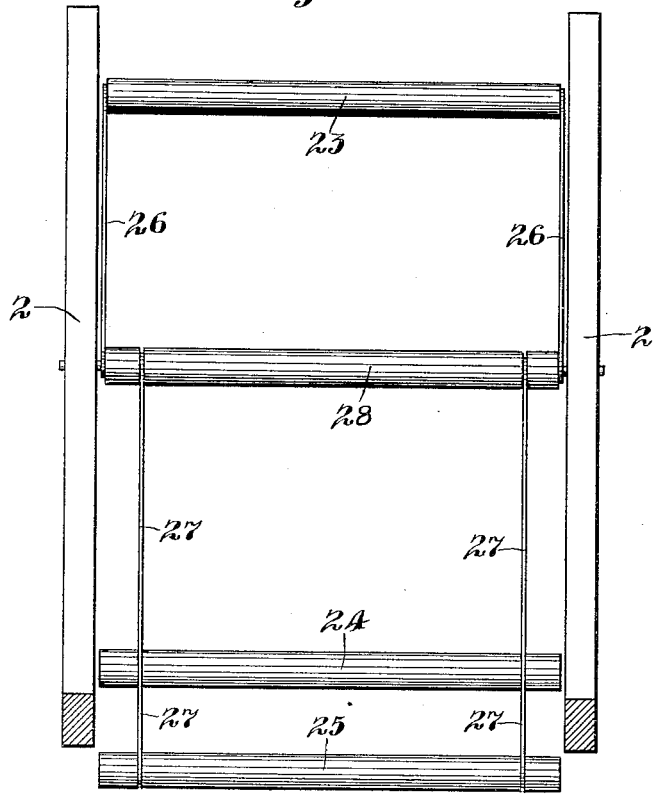
Figure 7:
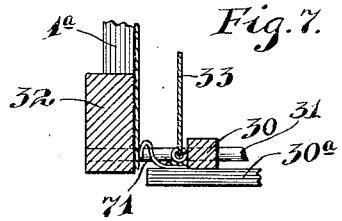

Referring to the drawings, Figure 1 is a plan view, showing the improved machine, some parts being broken away; Fig. 2 is a side elevation of the machine; Fig. 3 is a rear elevation of the machine, some parts being sectioned, on the line $x^3$ $x^3$ of Fig. 1; Fig. 4 is a transverse vertical section taken on the line $x^4$ $x^4$ of Fig. 1, some parts being broken away; Fig. 5 is a plan view showing a portion of the endless platform apron or carrier; Fig. 6 is a plan view, showing, in detail, the framework and floating rollers of the elevator mechanism; Fig. 7 is an enlarged detail taken on the section $x^7$ $x^7$ of Fig. 1; Fig. 8 is a detail in plan, showing the tripping mechanism for the fork actuating windlass clutch; Fig. 9 is a detail in rear elevation, with parts broken away, showing the clutch mechanism of the fork actuating windlass; and Fig. 10 is a view in plan, showing the right hand traction wheel and certain parts driven therefrom, some parts being broken away.

The main frame 1 of the machine is a rectangular structure and, at its left hand portion, as viewed from the rear, it carries a rigid skeleton elevator framework 2. A supplemental frame 3 which, as shown, is triangular in form, is connected to the rear of the main frame 1, by hinges 4, and carries the driver's seat 5 and is supported, at its rear extremity, by a caster wheel 6. The main frame 1 is supported by traction wheels 7 and 7' loosely journaled on a long axle 8 secured to suitable bearings on the intermediate portions of the sides of said frame 1. The traction wheel 7 carries a driving sprocket 9 and the traction wheel 7' carries a driving sprocket 10 (see Figs. 1, 3, 4 and 10).

The main frame 1 carries a platform deck 11 which terminates in an upwardly extended elevator deck 12 secured to the elevator frame 2, as best shown in Fig. 4. An endless slat and belt conveyer 13 runs over and under the decks 11 and 12 and is guided by rollers 14, 15, 16 and 17 journaled in suitable bearings on the frames 1 and 2. The endless conveyer 13 is preferably in the form of an endless canvas having slats secured thereon and secured, at its edges, to sprocket chains 18 that run over sprockets $14^a$ and $16^a$ secured to the ends of the rollers 14 and 16. The rollers 15 and 17 are idle rollers, and the former are shown in the form of wheels that are laterally spaced, so that they engage only with the upper faces of the chains 18. The so-called rollers 15 may, if desired, be in the form of sprockets engaged with the chains 18. The engagement of the chains 18 and sprockets noted insures positive movements of the endless apron or conveyer 13 and, furthermore, holds the same properly stretched laterally. The shaft of the roller 14 projects at the rear and is provided with a sprocket 19 for a purpose which will presently appear.

Working over and coöperating with the inclined upper portion of the endless belt or carrier 13 is a similar endless belt 20 which runs over rollers 21 and 22 and under rollers 23, 24 and 25. The rollers 21 and 22 are journaled in suitable bearings on the elevator frame 2, while the rollers 23, 24 and 25 are floating rollers. The roller 23 is journaled in the free ends of a pair of laterally spaced arms 26, while the rollers 24 and 25 are journaled in the free ends of laterally spaced arms 27. The arms 26 and 27 are pivoted on the shaft of an idle roller 28 which is journaled in the upper portion of the elevator frame 2. With this construction, the weight of the rollers 23, 24 and 25 and the arms supporting the same, serves to keep the lower portion of the belt 20 down upon the hay or grain which is being elevated by the inclined portion of the belt or carrier 13, but they will yield to permit the free passage of a bundle or excessively thick bunch of stock.

The shaft of the roller 21 projects at the rear and is provided with a sprocket 29 (see Figs. 1 and 3). Also, the said roller 21 carries sprockets 21$^a$ that engage the chains 20$^a$ of the elevator belt 20 and, hence, positively drive the latter when the said shaft 21 is rotated.

Located in front of the platform 11 is a gathering fork 30 provided, at its rear end, with a rigidly secured rock shaft 31, the ends of which are journaled in suitable bearings on the front portion of the frame 1. This fork is adapted to be lowered in contact with the ground or close to the ground and it is adapted to be raised approximately into a vertical position, as indicated by dotted lines in Fig. 2. Rigidly secured to the framework 1 and projecting on the opposite sides of the fork 30 are grain boards or dividers 32. Fork lifting cables 33 are attached at their front ends to the ends of an intermediate cross bar 30$^a$ of the fork 30. These cables are passed rearward over suitable guides 34 and 35 on a skeleton upper framework 1$^a$ secured to the frame 1. The rear ends of the cables 33 (see Figs. 3 and 9) are attached to the drums 36 of a windlass shaft 37 which is mounted in suitable bearings on the rear portion of the frame structure 1$^a$. On the righthand end of the shaft 37 is loosely journaled a sprocket 38 which carries a half clutch 39. A sprocket chain 40 runs over the sprocket 38 and over the sprocket 9 of the right hand traction wheel 7. Mounted to rotate with the shaft 37, but to slide thereon, is a half clutch 41 which, under the action of a coiled spring 42, tends to maintain engagement with the driven half clutch 39. The sliding half clutch 41 is provided with a peripheral groove 43 that is engaged by a crank 44 on the lower end of a vertical rock shaft 45 mounted in suitable bearings on the frame structure 1$^a$ and having a horizontally bent arm 46 at its upper end. The shipper crank 44 is connected by a link 47 to a lever 48 that is pivoted to the rear portion of the frame 1 (see Figs. 2 and 9).

Mounted to slide from front toward the rear of the machine, in suitable bearings on the upper righthand portion of the frame structure 1$^a$, is a clutch tripping bar 49, the rear end of which is adapted to engage and press rearward the arm 46 of the shipper crank shaft 45. The front end of the trip bar stands in position to be engaged and pressed rearward by the fork 30 and when the latter is turned upward to an extreme position shown by dotted lines in Fig. 2, a spring 49$^a$ yieldingly holds the bar 49 pressed forward as far as permitted by a stop 50 (see Fig. 8). When it is desired to drop the fork the clutch members 39—41 are held out of action by means of the lever 48.

The belts or conveyers 13 and 20 are driven from the left hand traction wheel 7' and this, as shown, is accomplished by the following connections, attention being here called to Figs. 1, 3 and 10: The sprocket 10 on the hub of said traction wheel is connected by a sprocket chain 51 to a sprocket 52 carried by a short countershaft 53 journaled in suitable bearings in the frame 1 and provided with a bevel gear 54. The bevel gear 54 meshes with a pinion 55 on the front end of a short countershaft 56 mounted in suitable bearings on the said frame 1 and provided, at its rear end, with a loose half clutch 57 and a sliding half clutch 58. The loose half clutch 57 carries a sprocket 59 and the sliding half clutch 58, which is connected to rotate the shaft 56 by a suitable key or otherwise, is yieldingly pressed by a spring 60 in engagement with the loose half clutch 57. The half clutch 58 may be disengaged from the half clutch 57 by a shipper lever 61 shown as pivoted to a projection of the frame 1. A long sprocket chain 62 runs over the sprocket 59, over the sprocket 19 of the roller 14, under the sprocket 29 of the roller 21, and over an idle guide wheel 63 journaled on a suitable bearing on the rear portion of the frame structure 1$^a$. With this mechanism, it is evident that the belts or conveyers 13 and 20 will be driven, under forward movement of the machine, whenever the clutch members 57 and 58 are engaged. Suitable means, not shown, may be provided for locking the lever 61 in a position to hold the said clutch members 57 and 58 disengaged.

For tilting the main frame 1, so as to raise and lower the front portions thereof, a connection piece, shown in Figs. 1 and 2, is provided. This connection includes a lever 64 and a link 65. The lever 64 is pivoted to and coöperates with a latch segment 66 secured on the supplemental frame 3, and the link 65 connects the said lever to a bracket 67 secured on the rear portion of the main frame 1. As is evident, by movements of the lever 64, the two frames 1 and 3 may be rocked on the pivotal connection 4, so as to set the front ends of the grain boards 32 as closely as desired to the ground, and also for setting the main frame 1 in a horizontal position, when the machine is out of use and is being moved from one place to another.

The machine is adapted to be driven by two horses located one on each side of the gathering fork and attached to the front ends of the draw rods 69, the rear ends of which are suitably attached to the main frame 1.

The numeral 70 indicates guide bars secured to the divider boards 32 and to which the horses may be tied when hitched to the swingle trees 68.

As shown in Figs. 1 and 7, the cross bar 30ª of the fork 30 is provided at its ends, with bent spring fingers 71 that frictionally engage the inner surfaces of the grain boards 32 and thereby retard the movement of the fork 30, as the same is nearing the completion of its downward movement. These spring fingers also hold the said fork for proper position when in its loading position.

When the machine is driven forward over the field and the fork is lowered, hay or cut grain in windrows or loose form or in bundles may be picked up and gathered on the fork. If the hay or grain is dry, it will usually slide over the fork and onto the belt or conveyer 13, but if wet, it will sometimes lodge upon the fork and it will then be necessary to raise the fork pivotally, so as to discharge the load onto the said belt 13. This pivotal movement of the fork will take place whenever, by manipulation of the lever 38, or otherwise, the half clutch 41 is engaged with the continuously driven half clutch 39. The said clutch members being thus engaged, the windlass devices 33—36 will be wound up, thereby positively tilting the loaded fork rearward, under the advance movement of the machine. When the fork reaches its extreme position, shown by dotted lines in Fig. 2, it will strike the trip bar 48 and, through the connections described, will positively disengage the clutch member 41 from the clutch member 39 and thus automatically throw the windlass devices out of action and permit the fork to drop back to its lowered position ready for another load.

The hay or grain delivered onto the belt 13 will be elevated and carried under the belt 20 and, by the combined action of the two belts, will be discharged at one side of the machine and into a wagon box or on to a rack driven at the side of the machine.

What we claim is:

1. In a machine of the kind described, the combination with a truck frame and wheels supporting the same, laterally spaced grain boards projecting forward from said frame, a fork working pivotally between said grain boards, means for oscillating said fork to deliver the load therefrom, means for releasing said fork oscillating means, and a continuously set retarding device operative on said fork during the last part of its return movement.

2. In a machine of the kind described, the combination with a truck frame and wheels supporting the same, laterally spaced grain boards projecting forward from said frame, a fork working pivotally between said grain boards, means for oscillating said fork to deliver the load therefrom, means for releasing said fork oscillating means, and a yielding retarding device carried by said fork and mounted in position for engagement with said grain board during the last part of the return movement of said fork.

3. In a machine of the kind described, the combination with a truck frame and wheels supporting the same, a fork pivoted to and projecting forward from said truck frame, a windlass shaft with cable connections to said fork for tilting the same, a connection including a spring set clutch for driving said windlass shaft from one of the truck wheels, means for throwing said clutch into action, at will, and means, including an endwise sliding spring set tripping bar, and a crank shaft, operated by said fork for throwing said clutch out of action when said fork has reached a predetermined raised position.

4. In a machine of the kind described, the combination with a truck frame and wheels supporting the same, a fork pivoted to and projecting forward from said truck frame, a windlass shaft with cable connections to said fork for tilting the same, a connection including a spring set clutch for driving said windlass shaft for one of the truck wheels, means for throwing said clutch into action, at will, and means, including an endwise sliding spring set tripping bar, extending from the front to the rear of the machine, and a crank shaft, operated by said fork for throwing said clutch out of action when said fork has reached a predetermined raised position.

In testimony whereof we affix our signatures in presence of two witnesses.

ANDREW B. MELHOUSE.
LARS P. MOGSTAD.

Witnesses:
A. L. LOMBARD,
W. F. LEHMANN.

Copies of this patent may be obtained for five cents each, by addressing the " Commissioner of Patents, Washington, D. C."